(12) United States Patent
Sugaya et al.

(10) Patent No.: US 11,823,227 B2
(45) Date of Patent: Nov. 21, 2023

(54) COMPUTER SYSTEM, AND METHOD AND PROGRAM FOR MANAGING ADVERTISING MEDIUM

(71) Applicant: OPTiM Corporation, Saga (JP)

(72) Inventors: Shunji Sugaya, Tokyo (JP); Keishi Murai, Tokyo (JP)

(73) Assignee: OPTIM CORPORATION, Saga (JP)

( * ) Notice: Subject to any disclaimer, the term of this patent is extended or adjusted under 35 U.S.C. 154(b) by 3 days.

(21) Appl. No.: 17/761,302

(22) PCT Filed: Aug. 5, 2019

(86) PCT No.: PCT/JP2019/030668
§ 371 (c)(1),
(2) Date: Mar. 17, 2022

(87) PCT Pub. No.: WO2021/024342
PCT Pub. Date: Feb. 11, 2021

(65) Prior Publication Data
US 2022/0351240 A1 Nov. 3, 2022

(51) Int. Cl.
*G06Q 30/02* (2023.01)
*G06Q 30/0241* (2023.01)
*G06V 20/50* (2022.01)

(52) U.S. Cl.
CPC ......... *G06Q 30/0248* (2013.01); *G06V 20/50* (2022.01)

(58) Field of Classification Search
CPC .............. G06Q 30/0248; G06V 20/50
See application file for complete search history.

(56) References Cited

U.S. PATENT DOCUMENTS

| | | | |
|---|---|---|---|
| 2011/0161790 A1* | 6/2011 | Junior | G06Q 30/02 715/764 |
| 2014/0091985 A1 | 4/2014 | Birch et al. | |
| 2017/0140644 A1* | 5/2017 | Hwang | G08C 17/02 |
| 2017/0243485 A1* | 8/2017 | Rubin | H04W 4/46 |
| 2018/0084310 A1* | 3/2018 | Katz | H04H 60/66 |
| 2018/0276716 A1 | 9/2018 | Mino et al. | |
| 2019/0042845 A1* | 2/2019 | Perkins | G06F 16/907 |
| 2019/0287141 A1* | 9/2019 | Bordeleau | G06Q 10/30 |

FOREIGN PATENT DOCUMENTS

| | | |
|---|---|---|
| JP | 2004-78573 | 3/2004 |
| JP | 2013-171501 | 9/2013 |
| JP | 2014-13512 | 1/2014 |
| JP | 2018-160069 | 10/2018 |
| WO | 2017/216599 | 12/2017 |

\* cited by examiner

*Primary Examiner* — Scott C Anderson
(74) *Attorney, Agent, or Firm* — LEX IP MEISTER, PLLC

(57) ABSTRACT

The present invention is to provide a computer system, and a method and a program for managing an advertising medium that easily identify an advertising medium. The computer system for managing an advertising medium outputs an identification image embedding the identification information of the advertising medium to the advertising medium, analyzes the shot image of the advertising medium outputting the identification image and reads the identification information of the advertising medium, and registers the identification information in a database.

9 Claims, 8 Drawing Sheets

COMPUTER SYSTEM, AND METHOD AND PROGRAM FOR MANAGING ADVERTISING MEDIUM

TECHNICAL FIELD

The present invention relates to a computer system, and a method and a program for managing an advertising medium.

BACKGROUND

It has been known that the advertising medium (e.g., digital signage) that outputs a variety of advertising contents. Such an advertising medium outputs advertising contents to a flat display, a projector, etc.

For example, the method of analyzing the effectiveness of the installation site of such an advertising medium, in which the effectiveness of the installation location is analyzed based on the reading result of a two-dimensional code output to the advertising medium, the location information of the mobile terminal that reads the two-dimensional code, and the invoice or the order of goods with the two-dimensional code, is disclosed (refer to Patent Document 1).

DOCUMENT IN THE EXISTING ART

Patent Document

Patent Document 1; JP 2004-78573 A

SUMMARY

However, the constitution of Patent Document 1 is not able to identify the advertising medium itself because the two-dimensional code included in the advertising medium is common to all the advertising media. Moreover, the constitution of Patent Document 1 is not able to assess the installation environment of the advertising medium because only the two-dimensional code output to the advertising medium is used.

An objective of the present invention is to provide a computer system, and a method and a program for managing an advertising medium that easily identify an advertising medium.

The present invention provides a computer system for managing an advertising medium, including;
an output unit that outputs an identification image embedding the identification information of the advertising medium to the advertising medium; and
a reading unit that analyzes a shot image of the advertising medium outputting the identification image and reads the identification information of the advertising medium; and
a registration unit that registers the identification information in a database.

According to the present invention, the computer system for managing an advertising medium outputs an identification image embedding the identification information of the advertising medium to the advertising medium, analyzes a shot image of the advertising medium outputting the identification image and reads the identification information of the advertising medium, and registers the identification information in a database.

The present invention is the category of a system, but the categories of a method, a program, etc. have similar functions and effects.

The present invention can provide a computer system, and a method and a program for managing an advertising medium that easily identify an advertising medium.

DETAILED DESCRIPTION

Embodiments of the present invention are described below with reference to the attached drawings. However, this is illustrative only, and the technological scope of the present invention is not limited thereto.

Overview of System for Managing an Advertising Medium 1

Figure 1:
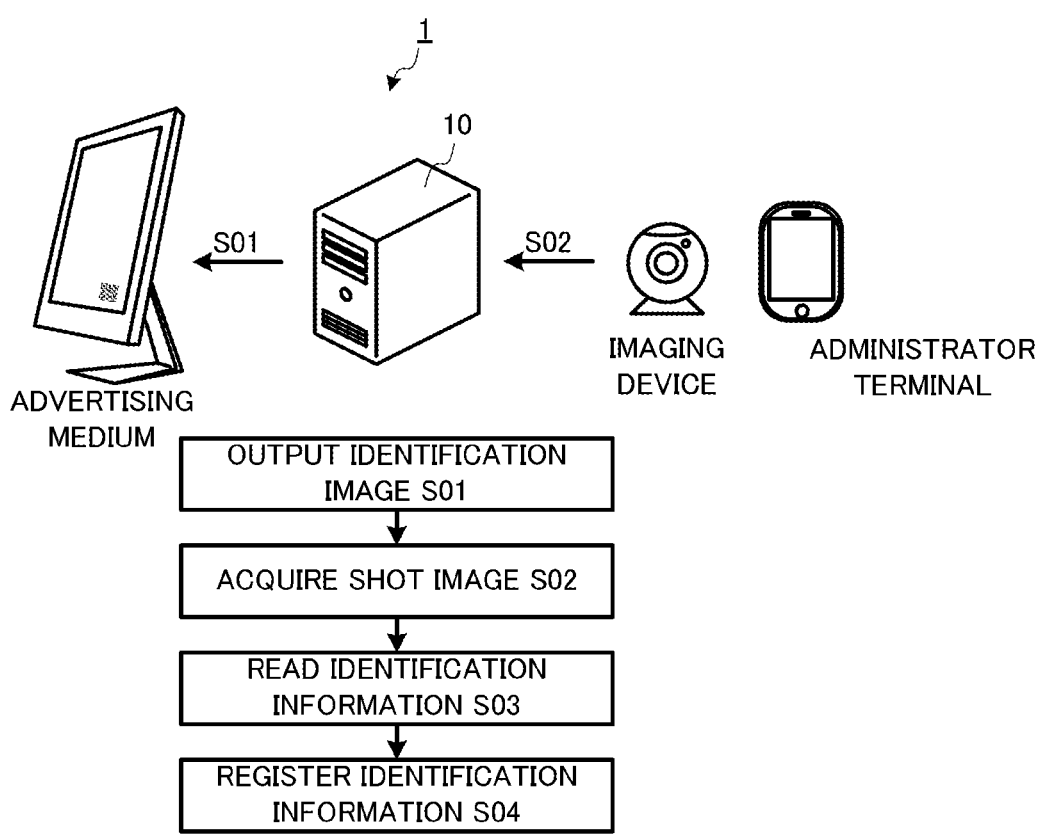
FIG. 1 is a schematic diagram of the system for managing an advertising medium 1.

A preferable embodiment of the present invention is described below with reference to FIG. 1. FIG. 1 shows an overview of the system for managing an advertising medium 1 according to a preferable embodiment of the present invention. The system for managing an advertising medium 1 is a computer system including a computer 10 to manage an advertising medium.

The system for managing an advertising medium 1 may include an advertising medium (e.g., digital signage) that outputs advertising contents; an administrator terminal (e.g., a mobile terminal such as a smart phone or a tablet terminal, a terminal device such as a personal computer, a wearable terminal such as a head-mounted display including smart glasses); an imaging device that takes an image such as a moving or a still image of the advertising medium or the periphery thereof. In this case, the system for managing an advertising medium 1 only has to perform the processes described later by any one or combination of the computer 10 and the above-mentioned terminals and devices.

The system for managing an advertising medium 1 may be achieved by one computer such as a computer 10 or a plurality of computers such as cloud computers.

The computer 10 is data-communicatively connected with the advertising medium, the administrator terminal, the imaging device and other terminals and devices to transceive necessary data.

The computer 10 outputs an identification image embedding the identification information of the advertising medium to the advertising medium. The advertising medium, which outputs a variety of advertising contents as mentioned above, is digital signage, for example. The advertising contents, which are to express companies, places, goods, services, etc., from advertisement providers to deliver to viewers, etc., are generated in moving images, still images, and texts, etc. The identification information includes a MAC address, an IP address, ID, and a management number. The identification image is generated by the computer 10 itself or other terminals and devices.

The computer 10 transmits the identification image to the advertising medium. The advertising medium receives and outputs the identification image. For example, the advertising medium displays the identification image and the advertising contents on its own display unit or outputs sounds from a voice part. As the result, the computer 10 has the advertising medium output the identification image.

The computer 10 acquires a shot image of the advertising medium being outputting the identification image. The computer 10 acquires the image of the identification image being output that is taken by an imaging device or an administrator terminal that is installed at a position where the imaging device or the administrator terminal can take the identification image.

The imaging device and the administrator terminal take the identification image as an image such as a moving or still image. The imaging device and the administrator terminal transmit the image to the computer 10 as a shot image. The computer 10 acquires the shot image of the advertising medium being outputting the identification image by receiving the shot image.

At this time, the computer 10 can acquire an image containing the periphery of the advertising medium as well as the identification image. The computer 10 acquires the above-mentioned identification and a shot image taken by an imaging device or the administrator terminal that is installed at a position where the imaging device or the administrator terminal can take the periphery of the advertising medium. The imaging device and the administrator terminal take the identification image and an image of the periphery of the advertising medium as an image such as a moving or still image as a shot image. The imaging device and the administrator terminal transmit the images to the computer 10. The computer 10 acquires the shot image of the advertising medium being outputting the identification image by receiving the shot images and an image containing the periphery of the advertising medium.

At this time, the computer 10 can acquire the location information of the shooting location as well as the identification image. The computer 10 acquires not only the shot image of the advertising medium being outputting the identification image but also the information of the shooting location. The imaging device transmits the preset location information and its location information acquired from GPS (GLOBAL POSITIONING SYSTEM), etc., together with an image to the computer 10. The administrator terminal transmits its location information acquired from GPS, etc., together with the shot image to the computer 10. The computer 10 acquires the shot image and the location information of the shooting information by receiving the shot image and the location information of the shooting location. At this time, the image taken by the imaging device or the administrator terminal may be not only the identification image but also an image containing the periphery of the advertising medium.

The computer 10 analyzes the acquired image and reads the identification information of the advertising medium. The computer 10 analyzes the acquired image, and extracts the feature point (e.g., shape, outline, hue) or the feature amount (e.g., statistical value such as average, dispersion, histogram, etc., of the pixel values) of the image. The computer 10 recognizes the identification image based on the feature point or the feature amount and reads the identification information embedded in the identification image.

The computer 10 can identify the installation environment around the advertising medium based on the analysis result. The computer 10 identifies an article, etc., that exists around the advertising medium based on the extracted feature point or the feature amount and the installation environment (e.g., the type of the installation site, the goods and services being sold in the installation site) of the advertising medium.

The computer 10 registers the read identification information. The computer 10 records the read identification information in the database, etc. If the installation environment is identified, the computer 10 can associate and register the read identification information with the installation environment. If the location information of the shooting location is acquired, the computer 10 can associate and register the read identification information with the location information. If the installation environment is identified and if the location information of the shooting location is acquired, the computer 10 can associate and register the read identification information with the installation environment and the location information.

If a new image taken at the shooting location associated with the location information registered in the past is acquired, the computer 10 analyzes the new image and reads the identification information of the advertising medium. At this time, if the identification information is unreadable in the image, the computer 10 deletes the identification information associated with the location information of the shooting location registered in the past. If an identification information different from the identification information registered in the past in this image is read, the computer 10 associates and registers the identification information newly read this time with the location information and deletes the identification information registered in the past.

The overview of the process that the system for managing an advertising medium 1 performs is described below.

The computer 10 outputs an identification image embedding the identification information of the advertising medium to the advertising medium (Step S01). The advertising medium and the identification information are as described above.

The computer 10 transmits the identification image to the advertising medium. The advertising medium receives and outputs the identification image. For example, the advertising medium displays the identification image on its own display unit. As the result, the computer 10 has the advertising medium output the identification image.

The computer 10 acquires a shot image of the advertising medium being outputting the identification image (Step S02). The computer 10 acquires a shot image taken by an imaging device terminal that is installed at the above-mentioned position an administrator terminal from the above-mentioned position.

The imaging device and the administrator terminal take the identification image as an image such as a moving or still image and transmit the image to the computer 10 as a shot image. The computer 10 acquires a shot image of the advertising medium being outputting the identification image by receiving the shot image.

The computer 10 analyzes the acquired image and reads the identification information of the advertising medium (Step S03). The computer 10 analyzes the shot image, and extracts the feature point or the feature amount. The computer 10 recognizes the identification image based on the feature point or the feature amount and reads the identification information embedded in the identification image.

The computer 10 registers the read identification information (Step S04). The computer 10 registers the read identification information in the database, etc.

Configuration of System for Managing an Advertising Medium 1

Figure 2:
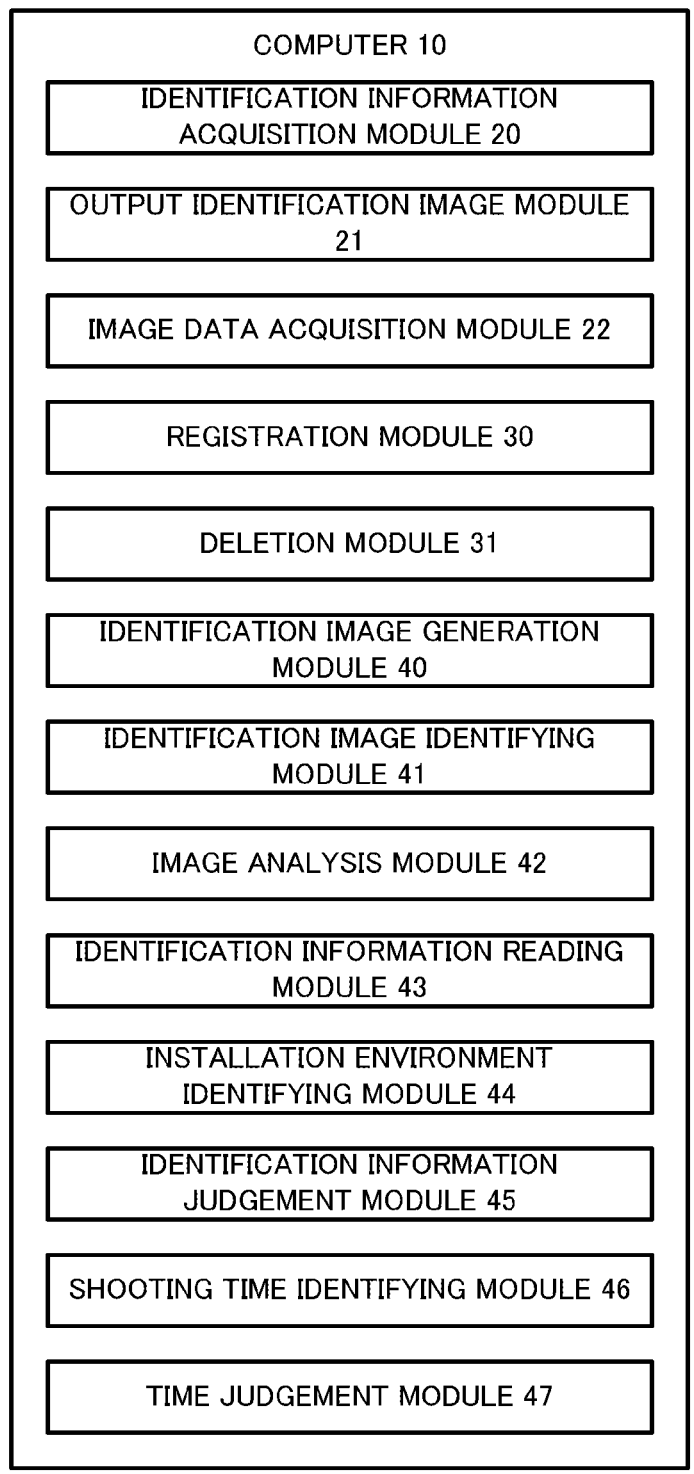
FIG. 2 is an overall configuration diagram of the system for managing an advertising medium 1.

A system configuration of the system for managing an advertising medium 1 according to a preferable embodiment will be described below with reference to FIG. 2. FIG. 2 shows a block diagram illustrating the system for managing an advertising medium 1 according to a preferable embodiment of the present invention. In FIG. 2, the system for managing an advertising medium 1 is a computer system including a computer 10 to manage an advertising medium.

The computer 10 is data-communicatively connected with the advertising medium, the administrator terminal, the imaging device, other terminals and devices which are not shown in the attached drawings to transceive necessary data.

The system for managing an advertising medium 1 may include the advertising medium, the administrator terminal, the imaging device, other terminals and devices which are not shown in the attached drawings. In this case, the system for managing an advertising medium 1 only has to perform the processes described later by any one or combination of the computer 10 and the above-mentioned terminals and devices.

The system for managing an advertising medium 1 may be achieved by one computer such as computers 10 or a plurality of computers such as cloud computers.

The computer 10 includes CPU (CENTRAL PROCESSING UNIT), GPU (GRAPHICS PROCESSING UNIT), RAM (RANDOM ACCESS MEMORY), ROM (READ ONLY MEMORY); and a communication unit such as a device that is capable to communicate with other terminals and devices, for example, Wi-Fi® (WIRELESS-FIDELITY) enabled device complying with IEEE 802.11. The computer 10 also includes a memory unit such as a hard disk, a semiconductor memory, a record medium, or a memory card to store data. The computer 10 also includes a processing unit provided with various devices that perform various processes.

In the computer 10, the control unit reads a predetermined program to achieve an identification information acquisition module 20, an identification image output module 21, and an image data acquisition module 22 in cooperation with the communication unit. Furthermore, in the computer 10, the control unit reads a predetermined program to achieve a registration module 30 and a deletion module 31 in cooperation with the record unit. Furthermore, in the computer 10, the control unit reads a predetermined program to achieve an identification image generation module 40, an identification image identifying module 41, an image analysis module 42, an identification information reading module 43, an installation environment identifying module 44, an identification information judgement module 45, a shooting time identifying module 46, and a time judgement module 47 in cooperation with the processing unit.

First Identification Image Registration Process

Figure 3:
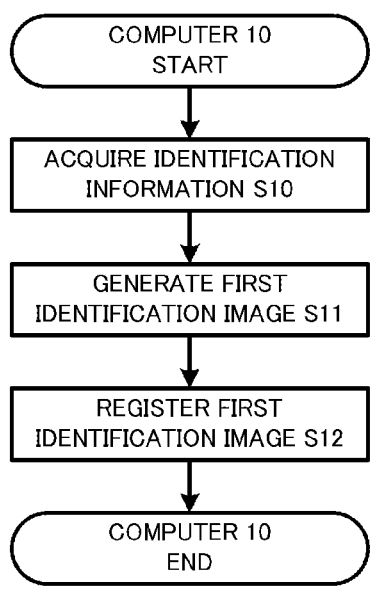
FIG. 3 is a flow chart illustrating the first identification image registration process performed by the computer 10.

The first identification image registration process performed by the system for managing an advertising medium 1 is described below with reference to FIG. 3. FIG. 3 is a flow chart illustrating the first identification image registration process performed by the computer 10. The tasks executed by the modules are described below with this process.

The identification information acquisition module 20 acquires the identification information of the advertising medium to output the identification image (Step S10). In Step S10, the identification information acquisition module 20 acquires the identification information from an administrator terminal, an advertising medium, etc. The administrator terminal transmits the identification information input from an administrator and the identification information of the advertising medium that is to be managed and that is registered in the administrator terminal to the computer 10. Alternatively, the advertising medium transmits the registered identification information to the computer 10. The identification information acquisition module 20 acquires the identification information of the advertising medium by receiving this identification information.

The identification image generation module 40 generates a first identification image embedding the acquired identification information based on the acquired identification information (Step S11). In Step S11, for example, the identification image generation module 40 generates a two-dimensional code or a digital watermark as the first identification image based on a known method.

The computer 10 may acquire the first identification image itself storing the identification information instead of processing Steps S10 and S11 described above.

The registration module 30 registers the generated first identification image (Step S12). In Step S12, the registration module 30 associates and registers the first identification image with the identifier (e.g., any identification information described above, the acquired identification information itself) of the advertising medium in the database, etc.

The registration module 30 may register only the first identification image.

First Advertising Medium Management Process

Figure 4:
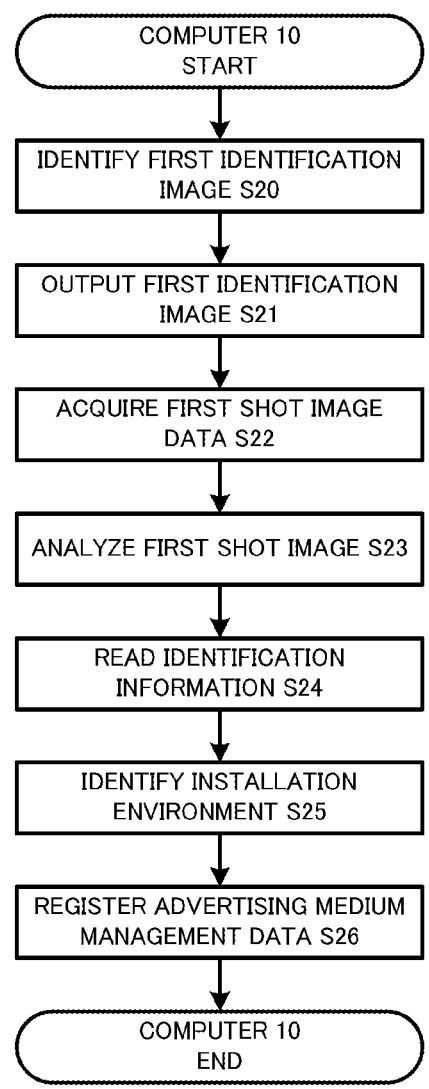
FIG. 4 is a flow chart illustrating the first advertising medium management process performed by the computer 10.

The first advertising medium management process performed by the system for managing an advertising medium 1 is described below with reference to FIG. 4. FIG. 4 is a flow chart illustrating the first advertising medium management process performed by the computer 10. The tasks executed by the modules are described below with this process.

The identification image identification module 41 identifies the first identification image to output to the advertising medium (Step S20). In Step S20, the identification image identification module 41 identifies the first identification image based on the output request from the administrator terminal or the advertising medium. The administrator terminal and the advertising medium transmit the output request to output the identifier and the first identification image of the advertising medium to output the first identification image to the advertising medium to the computer 10. The computer 10 acquires the output request by receiving the output request.

The identification image identification module 41 identifies the advertising medium to output the first identification image based on the output request. The identification image identification module 41 identifies the first identification image to be output to the advertising medium based on the identifier of the advertising medium contained in the output request. The identification image identification module 41 identifies an identifier matching that of the advertising medium contained in the output request from those registered by the process of the above-mentioned Step S12. The identification image identification module 41 identifies the first identification image associated and registered with the matched identifier of the advertising medium. As the result, the computer 10 identifies the advertising medium to output the first identification image and the first identification image to output to the advertising medium.

The identification image output module 21 outputs the first identification image embedding the identification information of the advertising medium to the advertising medium (Step S21). In Step S21, the identification image output module 21 transmits the first identification image to the advertising medium identified based on the output request. The advertising medium receives the first identification image. The advertising medium outputs the received first identification image. For example, the advertising medium displays the first identification image on its own display unit. The advertising medium superimposes the first identification image on the advertising contents that the advertising medium outputs. As the result, the computer 10 has the advertising medium output the identification image.

The advertising medium may output the first identification image to the blank space or other places of the advertising contents that the advertising medium outputs. The advertising medium may output the first identification image without outputting advertising contents.

The image data acquisition module 22 acquires the first shot image containing the advertising medium and the periphery thereof and the location information of the place at which the first shot image was taken (the location information of the shooting location of the first shot image) as the first shot image data (Step S22). In Step S22, the first shot image contains the advertising medium being outputting the first identification image and the installation environment around the advertising medium. In other words, the first identification image contains the first identification image together with the advertising medium. The location information is of the imaging device or the manager terminal that takes the first shot image.

The imaging device is installed at a position at which the imaging device can take the first identification image being output from the advertising medium and an image of the installation environment around the advertising medium. The imaging device takes the first identification image being output from the advertising medium and an image of the installation environment around the advertising medium. The imaging device uses the preset location information and its own location information acquired from GPS, etc., as the location information of the shooting location. The administrator terminal takes the first identification image being output from the advertising medium and an image of the installation environment around the advertising medium at a position in the same way as the imaging device. The administrator terminal uses its own location information acquired from GPS, etc., as the location information of the shooting location.

The imaging device and the administrator terminal transmit the first shot image and their own location information to the computer 10 as the first imaging data. The image data acquisition module 22 acquires the first shot image by receiving the first shot image data. As the result, the computer 10 acquires the first shot image containing the advertising medium and the periphery thereof and the location information of the shooting location.

The image data acquisition module 22 may acquire only the image of the advertising medium as the first shot image data. In this case, the registration module 30 registers only the identification information read from the first identification image in the process of Step S26 described later.

The image data acquisition module 22 may acquire the image containing the advertising medium and the installation environment around the advertising medium as the first shot image data. In this case, the registration module 30 associates and registers the identification information read from the first identification image with the identified installation environment in the process of Step S26 described later.

The image data acquisition module 22 may acquire the image of the advertising medium and the location information of the shooting location as the first shot image data. In this case, the registration module 30 associates and registers the identification information read from the first identification image with the acquired location information in the process of Step S26 described later.

The image analysis module 42 analyzes the acquired first shot image (Step S23). In Step S23, the image analysis module 42 analyzes the first shot image based on the acquired first shot image data. The image analysis module 42 extracts the feature point or the feature amount of the first shot image and recognize the first identification image being output from the advertising medium and an article, etc., around the advertising medium.

The identification information reading module 43 reads the identification information embedded in the recognized first identification image (Step S24). In Step S24, the identification information reading module 43 reads the identification information embedded in the first identification image based on a known method. For example, if the first identification image is a two-dimensional code, the identification information reading module 43 reads the two-dimensional code to read the identification information embedded therein.

The installation environment identifying module 44 identifies the installation environment of the advertising medium based on the recognized article, etc., around the advertising medium (Step S25). In Step S25, the installation environment identifying module 44 identifies what place the advertising medium is installed based on the recognized article, etc., around the advertising medium. For example, if the shelf lining up confections around is recognized, the installation environment identifying module 44 identifies that the installation environment of the advertising medium is the confectionery section in the supermarket. For example, if the shelf lining up liquors around is recognized, the installation environment identifying module 44 identifies that the installation environment of the advertising medium is the liquor section in the supermarket.

The installation environment identifying module 44 identifies the installation environment of the advertising medium based on the recognized article, etc., around the advertising medium and the acquired location information of the acquired shooting location (Step S25). In this case, the installation environment identifying module 44 identifies installation environment based on the recognition result of an article, etc., around the advertising medium and the location information of the shooting location. The installation environment identifying module 44 identifies the place where the advertising medium is installed based on the location information. For example, the installation environment identifying module 44 refers to a database associating and registering an outside map or location information with a place to identify the place where the advertising medium is installed. If the location information of the shooting location indicates a supermarket, the installation environment identifying module 44 identifies that the place where the advertising medium is installed is a supermarket. For example, if the shelf lining up confections around is recognized based on the recognition result of an article, etc., around the advertising medium, the installation environment identifying module 44 identifies that the installation environment of the advertising medium is the confectionery section in the identified supermarket. For example, if the shelf lining up liquors around is recognized based on the recognition result of an article, etc., around the advertising medium, the installation environment identifying module 44 identifies that the installation environment of the advertising medium is the liquor section in the identified supermarket.

The process of Steps S23 to S25 is described below with reference to FIG. 8.

Figure 8:
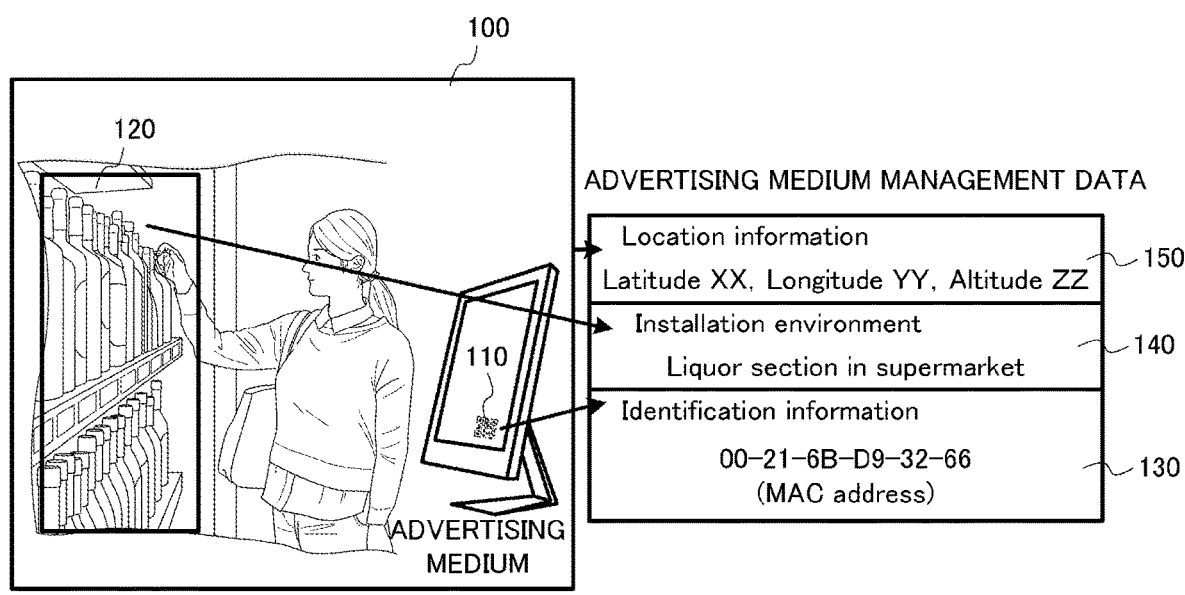
FIG. 8 schematically illustrates an example first shot image 100 acquired by the computer 10.

FIG. 8 schematically illustrates an example first shot image 100 that the image data acquisition module 22 acquires. In FIG. 8, the image analysis module 42 analyzes the first shot image 100 (Step S23). The image analysis module 42 recognizes the first identification image and an article, etc., around the advertising medium based on the image analysis result of the first shot image 100. The image analysis module 42 recognizes a two-dimensional code 110 as the first identification image. The image analysis module 42 also recognizes a shelf 120 lines up liquors as an article around the advertising medium.

The identification information reading module 43 reads the identification information embedded in the two-dimensional code 110 (Step S24). The identification information reading module 43 reads a MAC address 130 embedded in the two-dimensional code 110 as the identification information of the advertising medium by reading the two-dimensional code 110.

The installation environment identifying module 44 identifies the installation environment 140 of the advertising medium based on the shelf 120 lining up liquors that are articles around the advertising medium (Step S25). At this time, the installation environment identifying module 44 can identify the installation environment 140 based on the shelf 120 lining up liquors and the acquired location information as described above.

The location information 150 in FIG. 8 is based on the first shot image data.

The registration module 30 registers advertising medium management data associated with the read identification information, the identified installation environment, and the location information of the shooting location (Step S26). In Step S26, the registration module 30 registers the advertising medium management data in the advertising medium management database. At this time, the registration module 30 can add other information, etc., to the advertising medium management data in the advertising medium management database.

The registration module 30 may register only the identification information in the advertising medium management database as the advertising medium management data as described above. The registration module 30 may register the identification information and the installation environment in the advertising medium management database as the advertising medium management data as described above. The registration module 30 may register the identification information and the location information of the shooting location in the advertising medium management database as the advertising medium management data as described above.

Second Advertising Medium Management Process

Figure 5:
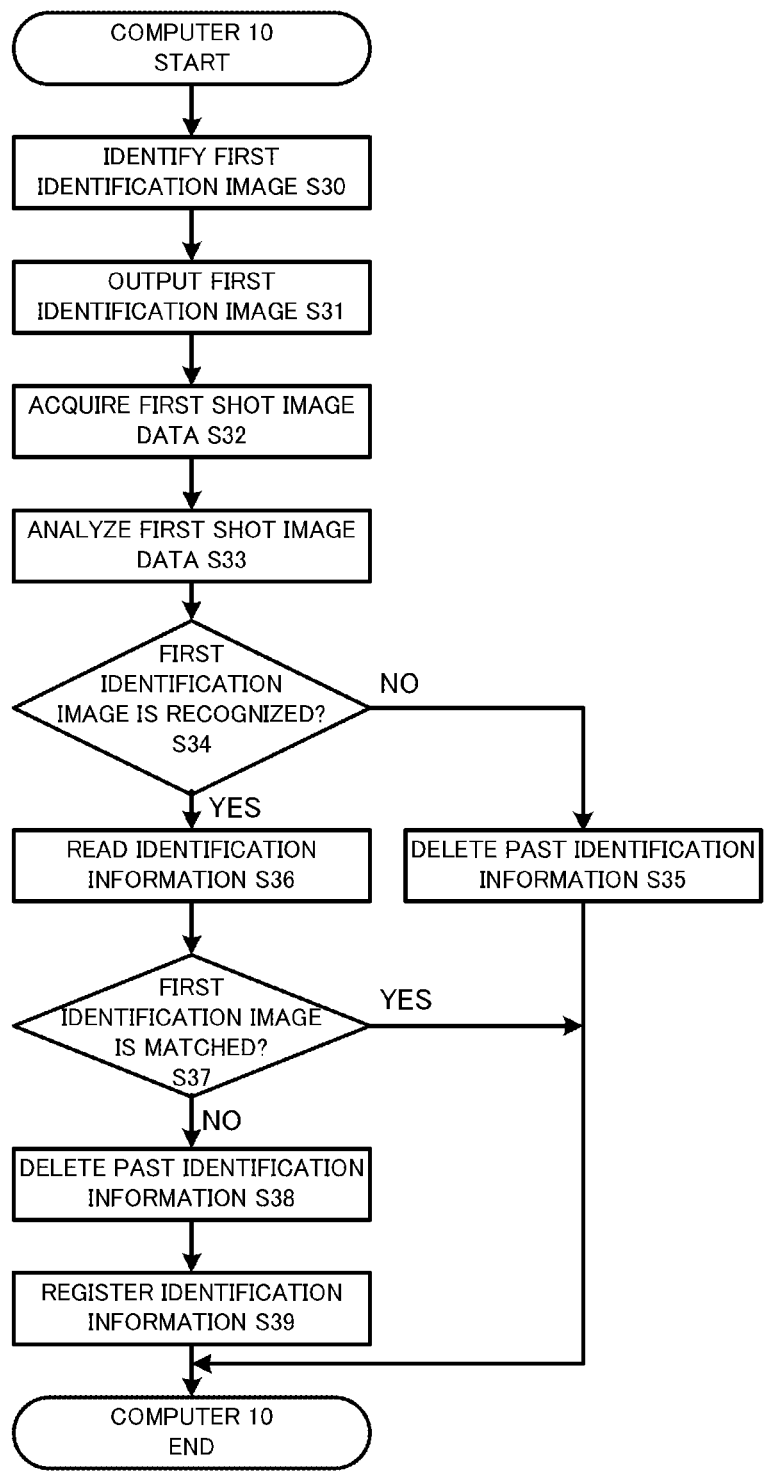
FIG. 5 is a flow chart illustrating the second advertising medium management process performed by the computer 10.

The second advertising medium management process performed by the system for managing an advertising medium 1 is described below with reference to FIG. 5. FIG. 5 is a flow chart illustrating the second advertising medium management process performed by the computer 10. The tasks executed by the modules are described below with this process. The detailed explanation of the tasks as same as those of the above-mentioned process is omitted.

The identification image identification module 41 identifies the first identification image to output to the advertising medium (Step S30). The Step S30 is processed in the same way as the above-mentioned Step S20.

The identification image output module 21 outputs the first identification image embedding the identification information of an advertising medium to the advertising medium (Step S31). The Step S31 is processed in the same way as the above-mentioned Step S21.

The image data acquisition module 22 acquires the first shot image containing the advertising medium and the periphery thereof and the location information of the place at which the first shot image was taken (the location information of the shooting location of the first shot image) as the first shot image data (Step S32). The Step S32 is processed in the same way as the above-mentioned Step S22.

The image analysis module 42 analyzes the acquired first shot image (Step S33). The Step S33 is processed in the same way as the above-mentioned Step S23.

The computer 10 may also perform the process of Step S25 described above based on the result of the image analysis.

The image analysis module 42 judges whether or not the first identification image is recognized (Step S34). In Step S34, the image analysis module 42 judges whether or not the first identification image is recognized based on the feature point or the feature amount extracted from the first shot image.

If the image analysis module 42 judges that the first identification image is not recognized as the result of the image recognition (Step S34 NO), the deletion module 31 deletes the identification information associated with the location information registered in the past as the advertising medium management data (Step S35). In Step S35, the deletion module 31 identifies the location information in the advertising medium management data registered in the advertising medium management database that matches the location information of the shooting location in the first shot image data acquired this time. The deletion module 31 deletes the advertising medium management data corresponding to the identified location information from the advertising medium management database. In other words, the computer 10 deletes the advertising medium management data corresponding to the identification information from the advertising medium management database because the computer 10 judges that the advertising medium registered in the past in the advertising medium management data and associated with the identification information associated with the location information was removed. The deletion module 31 in the process of Step S35 corresponds to the second deletion means.

If the deletion module 31 does not identify the location information in the advertising medium management data registered in the advertising medium management database that matches the location information of the shooting location in the first shot image data acquired this time, the process ends. In other words, if the identification information associated with the location information in the past is not registered, the computer 10 ends the process.

In the process of Step S35 described above, that the computer 10 does not recognize the first identification image means that the computer 10 is not able to read the identification information.

On the other hand, in Step S34, if the image analysis module 42 judges that the first identification image is recognized (Step S34 YES), the identification information reading module 43 reads the identification information embedded in the recognized first identification image (Step S36). The Step S36 is processed in the same way as the above-mentioned Step S24.

The identification information judgement module 45 judges whether or not the identification information read this time matches the identification information associated with the location information registered in the past as the advertising medium management data (Step S37). In Step S37, the identification information judgement module 45 identifies the location information in the advertising medium management data registered in the advertising medium management database that matches the location information of the shooting location in the first shot image data acquired this time. The identification information judgement module 45 judges whether or not the identification information read this time matches the identification information associated with the identified location information.

If the identification information agreement judgment module 45 judges that the identification information matches with each other (Step S37 YES), the computer 10 ends the process. In this case, the computer 10 judges that the advertising medium associated with identification information read this time is the same as the advertising medium registered in the past in the advertising medium management database, and therefore judges that the advertising medium management data does not need to be changed.

The registration module 30 may update the advertising medium management data based on the judgment result. For example, the registration module 30 can add the date and time when the first shot image was acquired or the date and time when the identification information was read to the associated advertising medium management data.

On the other hand, if the identification information agreement judgment module 45 judges that the identification information does not match with each other (Step S37 NO), the deletion module 31 deletes the identification information associated with the location information registered in the past as the advertising medium management data (Step S38). In Step S38, the deletion module 31 identifies the location information in the advertising medium management data registered in the advertising medium management database that matches the location information of the shooting location in the first shot image data acquired this time. The deletion module 31 deletes the identification information in the advertising medium management data corresponding to the identified location information from the advertising medium management database.

The registration module 30 registers the identification information read this time as the advertising medium management data instead of the identification information deleted by the process of Step S38 described above (Step S39). In Step S39, the registration module 30 associates and registers the identification information read this time with the location information of the installation environment and the shooting location that are associated with the identification information deleted this time in the advertising medium management database as new advertising medium management data.

The computer 10 may delete the advertising medium management data corresponding to the past identification information and register the advertising medium management data corresponding to the identification information newly read. In this case, after deleting the advertising medium management data corresponding to the past identification information, the computer 10 only has to identify the installation environment of the advertising medium, associate and register the identification information read this time, the installation environment identified this time, and the location information of the shooting location acquired this time with each other in the advertising medium management database as new advertising medium management data, in the same way as the process of Step S25 described above.

By performing the process of Steps S38 and S39 described above, the computer 10 judges that the advertising medium registered in the past in the advertising medium management data and associated with the identification information associated with the location information was removed, and therefore judges that the advertising medium associated with new identification information was installed at the place associated with the location information. The computer 10 deletes the identification information associated with the removed advertising medium from the advertising medium management data and registers the identification information associated with the advertising medium newly installed in the advertising medium management database as new advertising medium management data. The registration module 30 and the deletion module 31 in the process of Steps S38 and S39 correspond to the third deletion means.

Second Identification Image Registration Process

Figure 6:
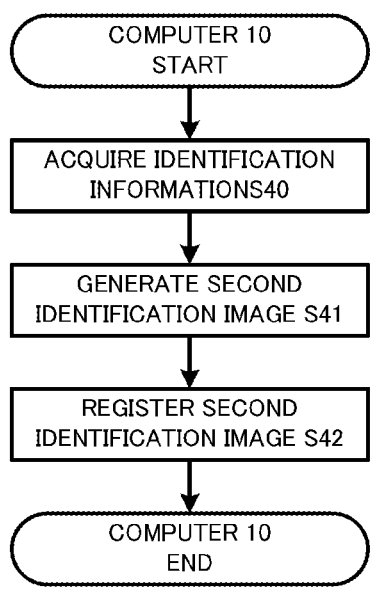
FIG. 6 is a flow chart illustrating the second identification image registration process performed by the computer 10.

The second identification image registration process performed by the system for managing an advertising medium 1 is described below with reference to FIG. 6. FIG. 6 is a flow chart illustrating the second identification image registration process performed by the computer 10. The tasks executed by the modules are described below with this process. The detailed explanation of the tasks as same as those of the above-mentioned process is omitted.

The identification information acquisition module 20 acquires the identification information of the advertising medium to output the identification image (Step S40). The Step S40 is processed in the same way as the above-mentioned Step S10.

The identification image generation module 40 generates a second identification image embedding the acquired identification information and the present date and time based on the acquired identification information and the present date and time (Step S41). In Step S41, the present date and time is approximately the same as the date and time of generation of the second identification image. For example, the identification image generation module 40 generates a two-dimensional code or a digital watermark as the second identification image based on a known method. The difference from the process of Step S11 described above is that the second identification image also embeds the present date and time (date and time of generation).

The computer 10 may acquire the second identification image itself embedding the identification information and the present date and time instead of process of Steps S40 and S41 described above.

The registration module 30 registers the generated second identification image (Step S42). In Step S42, the registration module 30 associates and registers the identifier of the advertising medium with the second identification image in the database, etc.

The registration module 30 may register only the second identification image.

The computer 10 performs the process of Steps S40 to S42 described above at regular intervals (e.g., every several days, one day, 12 hours, 6 hours). As the result, the registration module 30 registers the second identification image changing at regular intervals.

The deletion module 31 may delete the second identification image staying after a certain period of time. For example, the deletion module 31 may delete the second identification image associated with the identifier of the advertising medium in the past when the registration module 30 newly registers the second identification image by the process of Step S42 described above.

The computer 10 can use the second identification image in the first advertising medium management process and the second advertising medium management process. In this case, the computer 10 can use the second identification image instead of the first identification image in the first advertising medium management process and the second advertising medium management process.

Third Advertising Medium Management Process

Figure 7:
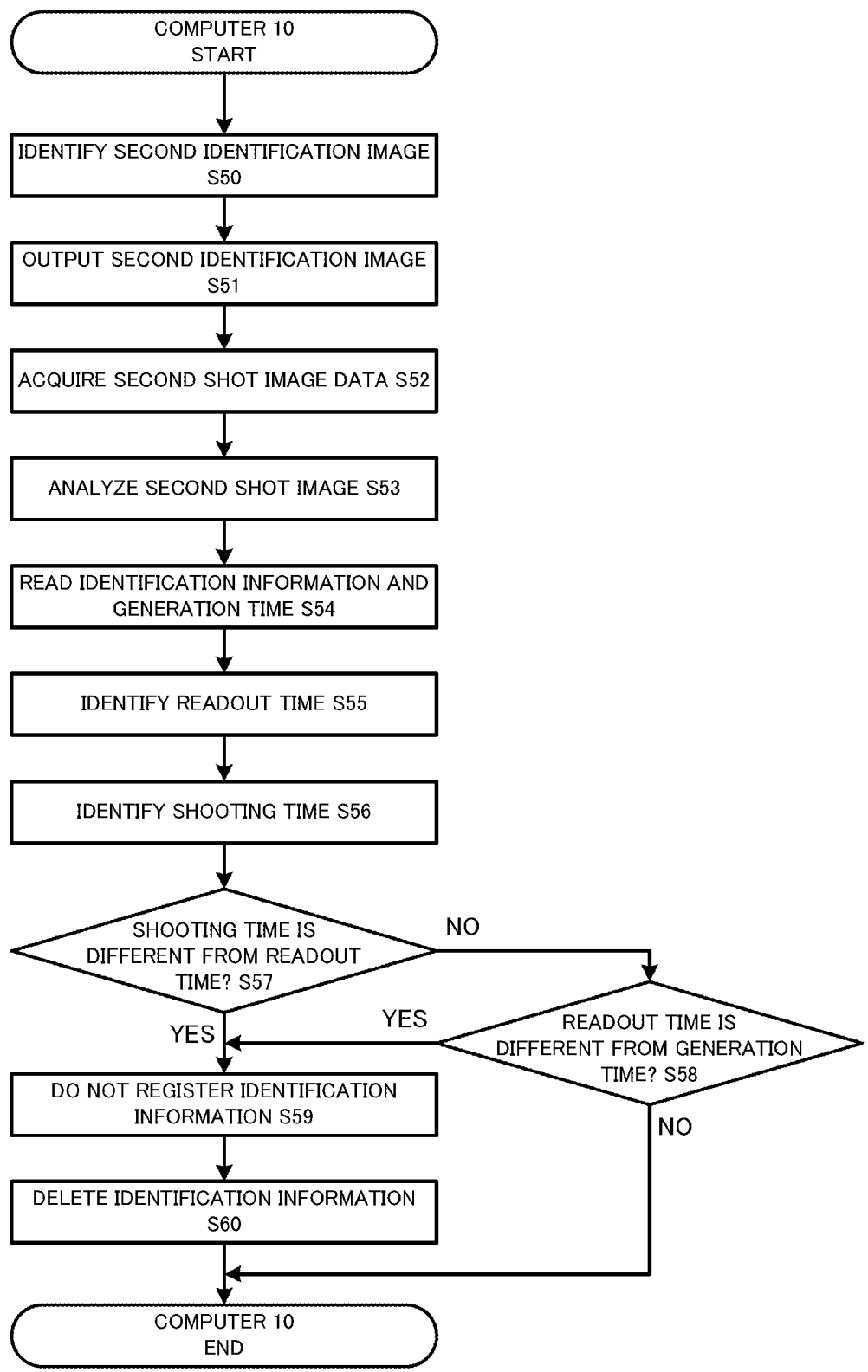
FIG. 7 is a flow chart illustrating the third advertising medium management process performed by the computer 10.

The third advertising medium management process performed by the system for managing an advertising medium 1 is described below with reference to FIG. 7. FIG. 7 is a flow chart illustrating the third advertising medium management process performed by the computer 10. The tasks executed by the modules are described below with this process. The detailed explanation of the tasks as same as those of the above-mentioned process is omitted.

The identification image identification module 41 identifies the second identification image to output to the advertising medium (Step S50). Step S50 is processed in the same way as Step S20. However, the difference between Steps S50 and S20 is that the second identification image is used instead of the first identification image. At this time, the second identification image that the identification image identifying module 41 identifies is registered by the process of Step S42 described above. The second identification image changes at regular intervals.

The identification image output module 21 outputs an identification image in which the second identification information of the advertising medium is embed that changes at regular intervals to the advertising medium (Step S51). Step S51 is processed in the same way as Step S21. However, the difference between Steps S51 and S21 is that the second identification image is used instead of the first identification image. As the result, the computer 10 has the advertising medium output the identification image changing at regular intervals.

The image data acquisition module 22 acquires the second shot image containing the advertising medium and the periphery thereof, the location information of the place at which the second shot image was taken (the location information of the shooting location of the second shot image), and the shooting time of the second shot image as the second shot image data (Step S52). Step S52 is processed in the same way as Step S22. However, the difference between Steps S52 and S22 is that the second shot image and the second shot image data are used instead of the first identification image and the first shot image data.

The image analysis module 42 analyzes the acquired second shot image (Step S53). Step S53 is processed in the same way as Step S23. However, the difference between Steps S53 and S23 is that the second shot image is used instead of the first shot image.

The computer 10 may also perform the process of Step S25 described above based on the result of the image analysis.

The identification information reading module 43 reads the identification information and the generation time that are embedded in the recognized second identification image (Step S54). In Step S54, the identification information reading module 43 reads the identification information and the generation time that are embedded in the second identification image based on a known method. For example, if the second identification image is a two-dimensional code, the identification information reading module 43 reads the two-dimensional code to read the identification information and the generation time that are embedded therein.

The identification information reading module 43 identifies the date and the time when the identification information and the generation time that were read this time as the readout time (Step S55). In Step S55, the identification information reading module 43 identifies the date and time when the identification information and the generation time were read from the second identification image as the readout time.

The shooting time identifying module 46 identifies the shooting time of the second shot image (Step S56). In Step S56, the shooting time identifying module 46 identifies the shooting time of the second shot image based on the shooting time contained in the second shot image data.

The time judgement module 47 judges whether or not the identified shooting time is a predetermined time or more different from the identified readout time (Step S57). In Step S57, for example, whether or not the identified shooting time is a predetermined time or more different from the identified readout time is whether or not the time difference between the shooting time and the readout time is the time when the second identification image changes or less. Specifically, if the second identification image changes every day, the time judgement module 47 judges whether or not the time difference between the shooting time and the readout time is one day or less. The time judgement module 47 judges whether or not the shooting time of the second identification image differs greatly from the readout time of the identification information.

If the time judgement module 47 judges that the shooting time of the second identification image is the readout time of the identification information or less (Step S57 YES), the computer 10 performs the process of Steps S59 and S60 described later.

On the other hand, if the time judgement module 47 judges that the shooting time of the second identification image is not the readout time of the identification information or less (Step S57 NO), the time judgement module 47 judges whether or not the identified readout time is a predetermined time or more different from the read generation time (Step S58). In Step S58, for example, whether or not the identified readout time is a predetermined time or more different from the read generation time is whether or not the time difference between the readout time and the generation time is the time when the second identification image changes or less. Specifically, if the second identification image changes every day, the time judgement module 47 judges whether or not the time difference between the readout time and the generation time is one day or less. The time judgement module 47 judges whether or not the readout time of the second identification image differs greatly from the generation time of the second identification image.

If the time judgement module 47 judges that the identified readout time is not a predetermined time or more different from the read generation time (Step S58 NO), the computer 10 ends the process. In this case, the computer 10 judges that identification information read this time is the same as the advertising medium registered in the past in the advertising medium management database, and therefore judges that the advertising medium management data does not need to be changed.

The registration module 30 may update the advertising medium management data based on the judgment result. For example, the registration module 30 can add the generation time, the readout time, and the shooting time to the associated advertising medium management data.

On the other hand, if the time judgement module 47 judges that the identified readout time is a predetermined time or more different from the read generation time (Step S58 NO), the registration module 30 does not register the identification information read this time as the advertising medium management data (Step S59). In Step S59, the registration module 30 does not register advertising medium management data associated with the read identification information, the identified installation environment, and the location information of the shooting location in the advertising medium management data (Step S56).

The deletion module 31 deletes the identification information associated with the location information registered in the past as the advertising medium management data (Step S60). In Step S60, the deletion module 31 identifies the location information in the advertising medium management data registered in the advertising medium management database that matches the location information of the shooting location in the second shot image data acquired this time. The deletion module 31 deletes the identification information in the advertising medium management data corresponding to the identified location information from the advertising medium management database. At this time, the deletion module 31 can delete this advertising medium management data itself.

By performing the process of Steps S59 and S60 described above, the computer 10 judges that the advertising medium registered in the past in the advertising medium management data and associated with the identification information associated with the location information was removed, judges that the advertising medium associated with new identification information is installed at the place associated with the location information, and therefore deletes the identification information associated with the removed advertising medium from the advertising medium management data. The computer 10 prevents an ill-disposed administrator from registering advertising medium associated with the identification information associated with the location information and registered in the past in the advertising medium management data in the advertising medium management data by using the photograph shot in the past.

The registration module 30 and the deletion module 31 in the process of Steps S59 and S60 correspond to the first deletion means.

To achieve the means and the functions that are described above, a computer (including a CPU, an information processor, and various terminals) reads and executes a predetermined program. For example, the program may be provided through Software as a Service (SAAS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

DESCRIPTION OF REFERENCE NUMERALS

1 System for managing an advertising medium
10 Computer

What is claimed is:

1. A computer system for managing a digital signage, comprising:
    one or more processors configured to:
        output an identification image embedding identification information of the digital signage as a two-dimensional code or digital watermark to the advertising medium;
        analyze a shot image of the digital signage outputting the identification image and read the identification information of the advertising medium;
        register the identification information in a database; and
        analyze the shot image containing the periphery of the digital signage and identify an installation environment of the digital signage, the installation environment indicating an environment of an installation site at which the digital signage is installed,
    wherein the one or more processors associate and register the identified installation environment with the identification information in the database, and
    wherein the one or more processors are configured to:
        extract a feature point or a feature amount of the shot image;
        identify an article existing around the digital signage based on the feature point or the feature amount; and
        identify the installation environment of the digital signage based on the article.

2. The computer system according to claim 1, wherein the one or more processors are configured to acquire the location information of the shooting location of the shot image, and associate and register the acquired location information with the identification information in the database.

3. The computer system according to claim 2, wherein the one or more processors are configured to delete the identification information associated with the location information from the database if the identification information cannot be read as the result of analyzing a new shot image taken at the shooting location associated with location information registered in the past in the database.

4. The computer system according to claim 2, the one or more processors are configured to delete the identification information registered in the past if the identification information different from the identification information registered in the past in the database is read as the result of analyzing a new shot image taken at the shooting location associated with location information registered in the past in the database, and a newly read identification information is registered.

5. The computer system according to claim 1, wherein the environment of the installation site includes a type of the installation site, or goods or services being sold in the installation site.

6. A method of managing a digital signage, executed by a computer system for managing the digital signage, comprising the steps of:

outputting an identification image embedding identification information of the digital signage as a two-dimensional code or digital watermark to the advertising medium;

analyzing the image of the digital signage outputting the identification image and reads the identification information of the advertising medium;

registering the identification information in a database; and analyzing a shot image containing the periphery of the digital signage and identifying the installation environment of the digital signage, the installation environment indicating an environment of an installation site at which the digital signage is installed, wherein the registering the identification information includes associating and registering the identified installation environment with the identification information in the database, and wherein the identifying the installation environment of the digital signage includes:

extracting a feature point or a feature amount of the shot image;

identifying an article existing around the digital signage based on the feature point or the feature amount; and identifying the installation environment of the digital signage based on the article.

7. The method according to claim 6, wherein the environment of the installation site includes a type of the installation site, or goods or services being sold in the installation site.

8. A non-transitory storage medium that stores a computer readable program causing a computer system for managing an digital signage to execute the steps of:

outputting an identification image embedding identification information of the digital signage as a two-dimensional code or digital watermark to the advertising medium;

analyzing the image of the digital signage outputting the identification image and reads the identification information of the advertising medium;

registering the identification information in a database; and analyzing a shot image containing the periphery of the digital signage and identifying the installation environment of the digital signage, the installation environment indicating an environment of an installation site at which the digital signage is installed, wherein the registering the identification information includes associating and registering the identified installation environment with the identification information in the database, and wherein the identifying the installation environment of the digital signage includes:

extracting a feature point or a feature amount of the shot image;

identifying an article existing around the digital signage based on the feature point or the feature amount; and identifying the installation environment of the digital signage based on the article.

9. The non-transitory storage medium according to claim 8, wherein the environment of the installation site includes a type of the installation site, or goods or services being sold in the installation site.

* * * * *